(12) United States Patent
Chen et al.

(10) Patent No.: US 9,965,705 B2
(45) Date of Patent: May 8, 2018

(54) SYSTEMS AND METHODS FOR ATTENTION-BASED CONFIGURABLE CONVOLUTIONAL NEURAL NETWORKS (ABC-CNN) FOR VISUAL QUESTION ANSWERING

(71) Applicant: Baidu USA, LLC, Sunnyvale, CA (US)

(72) Inventors: Kan Chen, Los Angeles, CA (US);
Jiang Wang, Santa Clara, CA (US);
Wei Xu, Saratoga, CA (US)

(73) Assignee: Baidu USA LLC, Sunnyvale, CA (US)

( * ) Notice: Subject to any disclaimer, the term of this patent is extended or adjusted under 35 U.S.C. 154(b) by 55 days.

(21) Appl. No.: 15/184,991

(22) Filed: Jun. 16, 2016

(65) Prior Publication Data

US 2017/0124432 A1 May 4, 2017

Related U.S. Application Data

(60) Provisional application No. 62/250,260, filed on Nov. 3, 2015.

(51) Int. Cl.
*G06K 9/00* (2006.01)
*G06K 9/66* (2006.01)
(Continued)

(52) U.S. Cl.
CPC ........... *G06K 9/66* (2013.01); *G06F 17/2785* (2013.01); *G06K 9/46* (2013.01); *G06K 9/6256* (2013.01); *G06K 9/6267* (2013.01); *G06N 3/02* (2013.01); *G06T 1/60* (2013.01); *G06K 2009/4666* (2013.01)

(58) Field of Classification Search
CPC ........ G06F 17/2785; G06K 2009/4666; G06K 9/46; G06K 9/6256; G06K 9/6267; G06K 9/66; G06N 3/02; G06T 1/60
See application file for complete search history.

(56) References Cited

U.S. PATENT DOCUMENTS

| | | | |
|---|---|---|---|
| 2005/0185835 A1* | 8/2005 | Matsugu | G06K 9/4619 382/159 |
| 2016/0132789 A1* | 5/2016 | Flinn | G06F 17/271 706/14 |

OTHER PUBLICATIONS

Mao et al., "Deep captioning with multimodal recurrent neural networks (M-RNN)," arXiv preprint arXiv:1412.6632, 2014 (14pgs).

(Continued)

*Primary Examiner* — Phuoc Tran
(74) *Attorney, Agent, or Firm* — North Weber & Baugh LLP

(57) ABSTRACT

Described herein are systems and methods for generating and using attention-based deep learning architectures for visual question answering task (VQA) to automatically generate answers for image-related (still or video images) questions. To generate the correct answers, it is important for a model's attention to focus on the relevant regions of an image according to the question because different questions may ask about the attributes of different image regions. In embodiments, such question-guided attention is learned with a configurable convolutional neural network (ABC-CNN). Embodiments of the ABC-CNN models determine the attention maps by convolving image feature map with the configurable convolutional kernels determined by the questions semantics. In embodiments, the question-guided attention maps focus on the question-related regions and filters out noise in the unrelated regions.

20 Claims, 8 Drawing Sheets

(51) Int. Cl.
G06F 17/27 (2006.01)
G06K 9/46 (2006.01)
G06K 9/62 (2006.01)
G06T 1/60 (2006.01)
G06N 3/02 (2006.01)

(56) References Cited

OTHER PUBLICATIONS

Mnih et al., "Recurrent models of visual attention," In Advances in Neural Information Processing Systems, p. 2204-2212, 2014 (9pgs).
Ren et al., "Exploring models and data for image question answering," In arXiv:1505.02074. 2015 (12pgs).
Sermanet et al., "Attention for finegrained categorization," arXiv preprint arXiv:1412.7054, 2014 (11pgs).
Siberman et al., "Indoor segmentation and support inference from rgbd images," In Computer Vision—ECCV 2012, p. 746-760, Springer, 2012 (59pgs).
Simonyan et al., "Very deep convolutional networks for large-scale image recognition," arXiv preprint arXiv:1409.1556, 2014 (14pgs).
Sun et al., "Automatic concept discovery from parallel text and visual corpora," arXiv preprint arXiv:1509.07225, abs/1509.07225, 2015 (9pgs).
Sutskever et al., "Sequence to sequence learning with neural networks," In Advances in neural information processing systems, p. 3104-3112, 2014 (9pgs).
Venugopalan et al., "Translating videos to natural language using deep recurrent neural networks," arXiv preprint arXiv:1412.4729, 2014 (11pgs).
Vinyals et al., "Show and tell: A neural image caption generator," arXiv preprint arXiv:1411.4555, 2014 (9pgs).
Wu et al., "Verbs semantics and lexical selection," In Proceedings of the 32nd annual meeting on Association for Computational Linguistics, 1994, p. 133-138 (7pgs).
Zeiler et al., "ADADELTA: An adaptive learning rate method," arXiv preprint arXiv:1212.5701, 2012 (6pgs).
Zitnick et al., "Learning the visual interpretation of sentences," In Computer Vision (ICCV), 2013 IEEE International Conference on, p. 1681-1688. IEEE, 2013 (8pgs).
Xu et al., "Show, attend and tell: Neural image caption generation with visual attention," International Conference on Machine Learning (ICML), 2015 (22pgs).
Bottou et al.,"The tradeoffs of large scale learning", In J.Platt, D. Koller, Y.Singer, and S. Roweis, editors, Advances in Neural Information Processing Systems, 2008 (8pgs).
European Search Report dated Mar. 8, 2017, in International Patent Application No. EP 16197146, dated Mar. 16, 2017 (8 pgs).

Mengye Ren et al., "Exploring Models and Data for Image Question Answering", <URL: http://www.cs.toronto.edu/zemel/documents/nips2015full.pdf/>, May 8, 2015 (12 pgs).
Antol et al., "VQA: Visual question answering," arXiv preprint arXiv:1505.00468, 2015 (9pgs).
Ba et al., "Multiple object recognition with visual attention," In ICLR, 2014 (10pgs).
Chatfield et al., "Return of the devil in the details: Delving deep into convolutional nets," arXiv preprint arXiv:1405.3531, 2014 (11pgs).
Chen et al., "Semantic image segmentation with deep convolutional nets and fully connected crfs," arXiv preprint arXiv:1412.7062, 2014 (14pgs).
Deng et al., "ImageNet: A large-scale hierarchical image database," In Computer Vision and Pattern Recognition, CVPR 2009, IEEE Conference on, p. 248-255. IEEE (8pgs).
Donahue et al., "Long-term recurrent convolutional networks for visual recognition and description," arXiv preprint arXiv:1411.4389, 2014 (10pgs).
Gao et al., "Are you talking to a machine? Dataset and methods for multilingual image question answering," arXiv preprint arXiv:1505.05612, 2015 (10pgs).
Hochreiter et al., "Long short-term memory," Neural computation, 9 (8)1735-1780, 1997 (32pgs).
Jin et al., "Aligning where to see and what to tell: image caption with regionbased attention and scene factorization," arXiv preprint arXiv:1506.06272, 2015 (20pgs).
Karpathy et al., "Deep visual-semantic alignments for generating image descriptions," arXiv preprint arXiv:1412.2306, 2014 (17pgs).
Klein et al., "A dynamic convolutional layer for short range weather prediction," In Proceedings of the IEEE Conference on Computer Vision and Pattern Recognition, p. 4840-4848,2015 (9pgs).
LeCun et al., "Backpropagation applied to handwritten zip code recognition," Neural computation, 1(4):541-551, 1989 (11pgs).
LeCun et al., "Efficient BackProp," In Neural networks: Tricks of the trade, p. 9-48. Springer, 2012 (44pgs).
Lin et al., "Microsoft COCO: Common objects in context," In Computer Vision—ECCV 2014, p. 740-755. Springer, 2014 (16pgs).
Lin et al., Bilinear CNN models for fine-grained visual recognition, arXiv preprint arXiv:1504.07889, 2015 (11pgs).
Long et al., "Fully convolutional networks for semantic segmentation," arXiv preprint arXiv:1411.4038, 2014 (10pgs).
Malinowski et al., "A multi-world approach to question answering about real-world scenes based on uncertain input," In Advances in Neural Information Processing Systems, p. 1682-1690,2014 (9pgs).
Malinowski et al., "Ask your neurons: A neural-based approach to answering questions about images," arXiv preprint arXiv:1505.01121, 2015 (13pgs).

* cited by examiner

600

| IMAGE COCOQA: 74 | IMAGE COCOQA: 536 | IMAGE DAQUAR: 630 | IMAGE DAQUAR: 14 |

Q: What rests on the street next to a bicycle?
A: Puppy

Q: What is the color of the dresses?
A: Purple
Q: What are three women dressed up and on?
A: Phones Q: What is the object close to the wall?
A: whiteboard
Q: What is the object in front of the sofa?
A: table Q: What is the largest object?
A: sofa
Q: How many windows are there?
A: 2

| IMAGE VQA-1 | IMAGE VQA-2 | IMAGE VQA-3 | IMAGE VQA-4 |

Q: How many bikes are there?
A: 2
Q: What number is the bus?
A: 48

Q: How many pickles are on the plate?
A: 1
Q: What is the shape of the plate?
A: round Q: What does the sign say?
A: stop
Q: What shape is this sign?
A: octagon Q: What type of trees are here?
A: palm
Q: Is the skateboard airborne?
A: yes

SYSTEMS AND METHODS FOR ATTENTION-BASED CONFIGURABLE CONVOLUTIONAL NEURAL NETWORKS (ABC-CNN) FOR VISUAL QUESTION ANSWERING

CROSS-REFERENCE TO RELATED APPLICATION

This application claims the priority benefit under 35 USC § 119(e) to commonly assigned and U.S. Provisional Patent Application No. 62/250,260, filed on Nov. 3, 2015, entitled "Systems And Methods For Attention Based Configurable Convolutional Neural Networks (ABC-CNN) For Visual Question Answering" and listing Kan Chen, Jiang Wang, and Wei Xu as inventors. The aforementioned patent document is incorporated by reference herein in its entirety.

A. TECHNICAL FIELD

The present disclosure relates generally to computing technologies, and more specifically to systems and methods for automating the task of answering of questions for image-related questions and improving human-computer interfacing.

B. BACKGROUND

Issues exists about how to automatically answer questions related to images. While there have been attempts to use deep learning to automate the process of answering questions, significant improvements are still needed.

Accordingly, what is needed are systems and methods that provide more effective and accurate ways to automatically answer questions related to images.

BRIEF DESCRIPTION OF THE DRAWINGS

References will be made to embodiments of the invention, examples of which may be illustrated in the accompanying figures. These figures are intended to be illustrative, not limiting. Although the invention is generally described in the context of these embodiments, it should be understood that it is not intended to limit the scope of the invention to these particular embodiments. Items in the figures are not to scale.

FIG. 6 depicts some example images, each identified by its respective dataset's number, and corresponding QA pairs according to embodiments of the present disclosure.

FIG. 7 show selected images with image-related questions and question-guided attention maps generated by ABC-CNN in Toronto COCO-QA dataset, in accordance with embodiments of the present disclosure.

DETAILED DESCRIPTION OF THE PREFERRED EMBODIMENTS

Figure 1:
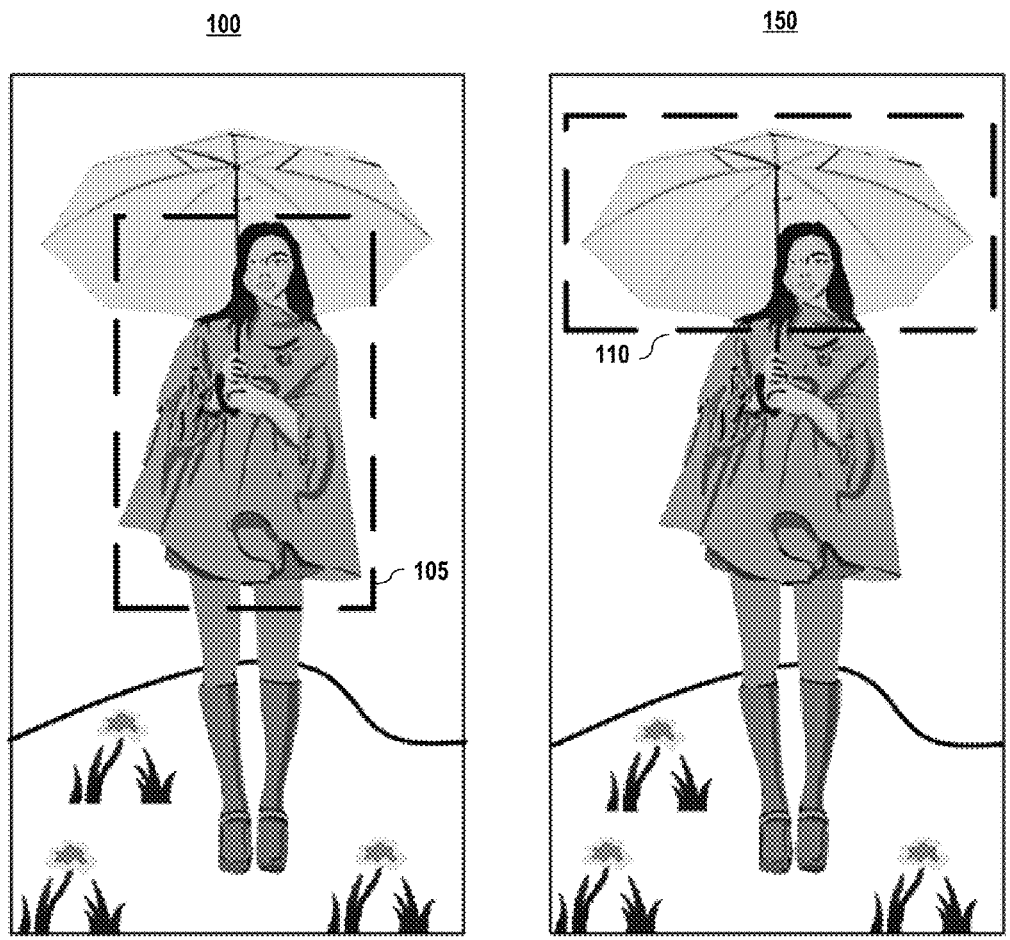
FIG. 1 illustrates the issue of attention in visual question answering according to embodiments of the present disclosure.

In the following description, for purposes of explanation, specific details are set forth in order to provide an understanding of the invention. It will be apparent, however, to one skilled in the art that the invention can be practiced without these details. Furthermore, one skilled in the art will recognize that embodiments of the present invention, described below, may be implemented in a variety of ways, such as a process, an apparatus, a system, a device, or a method on a non-transitory computer-readable medium.

Components, or modules, shown in diagrams are illustrative of exemplary embodiments of the invention and are meant to avoid obscuring the invention. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the invention and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated. The terms "include," "including," "comprise," and "comprising" shall be understood to be open terms and any lists the follow are examples and not meant to be limited to the listed items. The term "image" shall be understood to include still or video images. Any headings used herein are for organizational purposes only and shall not be used to limit the scope of the description or the claims. Each reference mentioned in this patent document is incorporated by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

A. Introduction

Visual question answering (VQA) is an active interdisciplinary research area of computer vision, natural language processing, and machine learning. Given an image and an image related natural language question, VQA answers the question using a natural language sentence. VQA is not only an essential step towards building artificial intelligence, but also of great importance to many applications, such as image retrieval, blind person navigation, and early child education. VQA is a challenging task as it requires sophisticated compute vision techniques to deeply understand images, advanced natural language processing techniques to extract the meaning of questions, and unified frameworks to effectively integrate the visual and semantic information.

Currently, most state-of-the-art VQA models contain a vision part, a natural language part, and an answer generation part. The vision part extracts visual features from input images, with deep convolutional neural network (CNN) [see, e.g., Y. A. LeCun, L. Bottou, G. B. Orr, and K. R. Muller. Efficient backprop. In *Neural networks: Tricks of the trade*, pages 9-48. Springer, 2012] or traditional visual feature extractors. The natural language part learns a dense question embedding to encode the question semantics, with Bag-of-Words model or a recurrent neural network (RNN) [see, e.g., S. Hochreiter and J. Schmidhuber. Long short-term memory. *Neural computation*, 9(8):1735-1780, 1997] model. The answer generation part produces an answer given the visual features and the question embedding. The answer can either be a single word answer generated by a multi-class classifier or a full sentence generated by an additional RNN decoder. The global visual features and dense question embeddings are integrated through a linear/non-linear joint projection. This integration is normally not sufficient to fully exploit the relationship of the vision part and the question understanding part.

Embodiments of a novel attention-based configurable convolutional neural network (ABC-CNN) as a unified framework are presented herein that integrate the visual and semantic information for VQA. When trying to answer a question about an image, humans tend to focus on the informative regions according to the question's intent before giving the answer. For example, in FIG. 1, considering the query "What is the color of the coat?", it is common for human to find the region of coat before judging its color to answer the question. The mechanism of finding these regions is called question guided attention, because these regions are determined by both images and image-related questions.

Given an image and an image-related question, the proposed framework not only generates a natural language answer, but also provides question-guided attention information as an important evidence to answer the question. In embodiments, the VQA task was considered with single word answers; however, embodiments can be easily extended to generate full sentences by using, for example, an RNN decoder.

Figure 2:
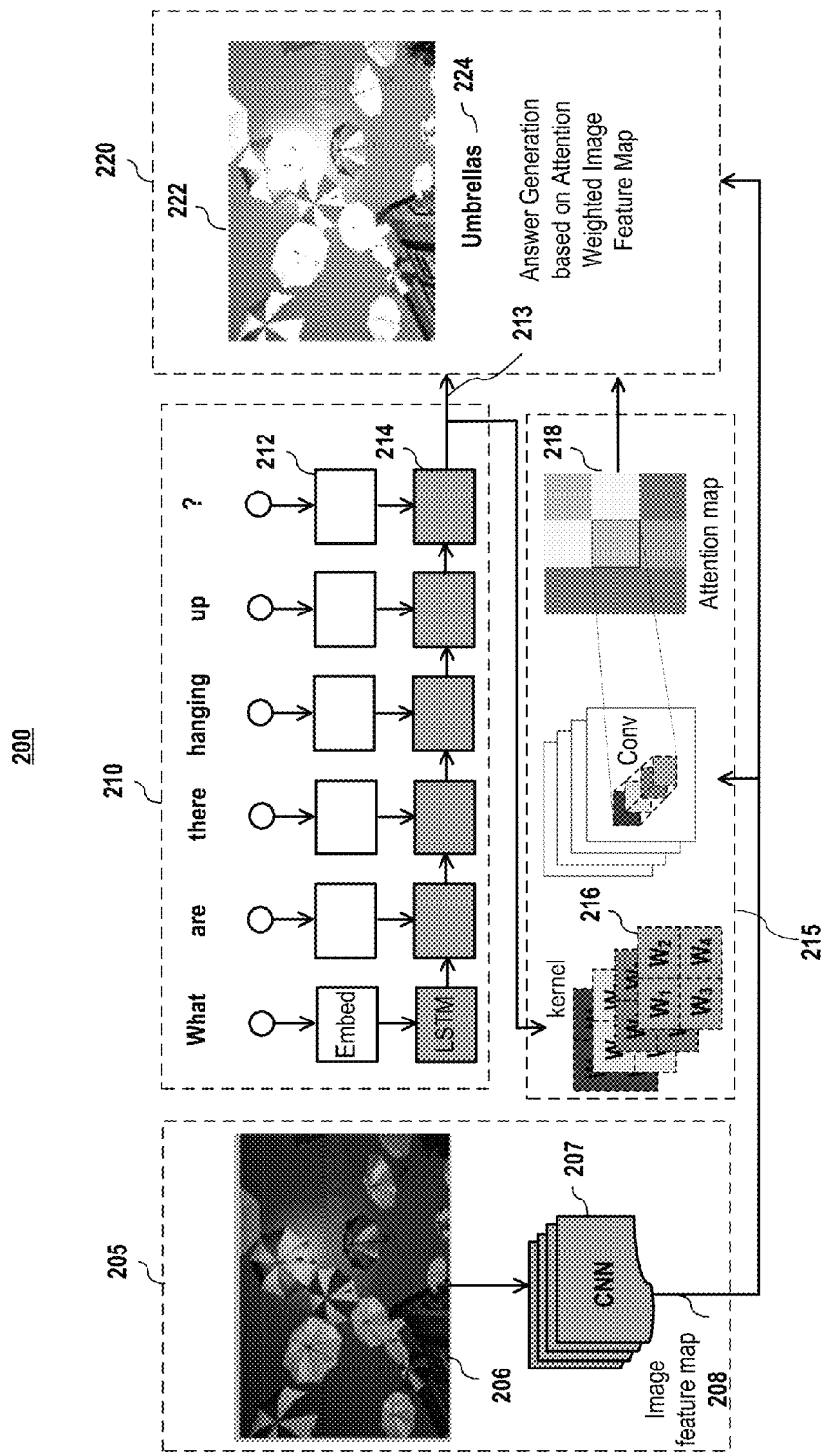
FIG. 2 depicts an example pipeline, or framework, in accordance with embodiments of the present disclosure.

To handle these problems, embodiments of an attention-based configurable convolutional neural network (ABC-CNN) are presented. An example ABC-CNN framework 200 in accordance with some embodiments of the present disclosure is shown in FIG. 2. The ABC-CNN framework contains a vision part (also referred as image feature map extraction part), a questioning understand part, an answer generation part, and an attention extraction part. In the depicted embodiments, box 205 denotes the vision part or component; box 210 is the questioning understand part or component; box 215 illustrates the attention extraction part or component with configurable convolution; and box 220 is the answer generation part or component using multi-class classification on attention weighted feature maps 222.

In embodiments, a convolutional neural network (CNN) 207 is employed to extract visual features in the vision part. Instead of extracting a single global visual feature, a spatial feature map is extracted to retain crucial spatial information, by either applying a CNN in a sliding window way or with a fully convolutional neural network. In embodiments, a long-short term memory (LSTM) model 214 is used to obtain question embeddings 212 in the question understanding part, and a multi-class classifier is utilized to generate answers in the answer generation part. The vision and the question understanding parts are integrated by exploiting the question-guided attention.

In embodiments, the question-guided attention information is represented as a question-guided attention map 218 within the attention extraction part 215, which is the core of the ABC-CNN framework. It is achieved via a configurable convolutional neural network, where the convolutional kernels 216 are generated by projecting the question embeddings from the semantic space into the visual space. The configurable convolutional kernels correspond to the visual information determined by the meaning of the question. For example, in FIG. 1, the question "what is the color of the umbrella?" should generate convolutional kernels that correspond to the "umbrella" visual features. Convolving the configurable convolutional kernels with image feature maps adaptively represents each region's importance for answering the given question as a question-guided attention map. The question-guided attention maps 218 can be utilized to spatially weight the visual feature maps to filter out noise and unrelated information. In embodiments, the ABC-CNN is a unified framework that effectively integrates image and language understanding and that can be trained in an end-to-end way without requiring any manual labeling of attention regions in images.

In the experiments, embodiments of the ABC-CNN architecture in accordance with the present disclosure were evaluated on three benchmark VQA datasets: Toronto COCOQA [M. Ren, R. Kiros, and R. Zemel. Exploring models and data for image question answering. In *arXiv:*1505.02074. 2015], DAQUAR [M. Malinowski and M. Fritz. A multi-world approach to question answering about real-world scenes based on uncertain input. In *Advances in Neural Information Processing Systems*, pages 1682-1690, 2014] and VQA [S. Antol, A. Agrawal, J. Lu, M. Mitchell, D. Batra, C. L. Zitnick, and D. Parikh. VQA: Visual question answering. *arXiv preprint arXiv:*1505.00468, 2015]. The experiments show that the ABC-CNN framework significantly outperforms state-of-the-art methods. The visualization demonstrates that the ABC-CNN architecture is capable of generating attention maps that well reflect the regions queried by questions.

In summary, a unified ABC-CNN framework is disclosed to effectively integrate the visual and semantic information for VQA via question-guided attention. Not only does the question-guided attention significantly improve the performance of VQA systems, but it also helps gain a better understanding of the question answering process.

B. Related Work

VQA & Image Captioning:

These two problems share similarities in reasoning about the visual contents and presenting the results in natural language. Current state-of-the-art methods in VQA and image captioning tend to apply a CNN to extract visual features and an LSTM model as a decoder to generate the answers or captions. Some methods apply a multi-model layer to combine the visual features and word embedding vector by a joint projection during the generation in the LSTM decoder. At least one other [see P. Sermanet, A. Frome, and E. Real. Attention for fine-grained categorization. *arXiv preprint arXiv*:1412.7054, 2014] employs the projected image features as the starting state of the LSTM decoder, similarly as the encoder-decoder framework in sequence-to-sequence learning [see I. Sutskever, O. Vinyals, and Q. V. Le. Sequence to sequence learning with neural networks. In *Advances in neural information processing systems*, pages 3104-3112, 2014]. Treating image features as global visual features, they fail to exploit the valuable information in questions to focus their attention on the corresponding regions in images.

Attention Model:

Attention models have been successfully adopted in many computer vision tasks, including object detection, fine-grained image classification, fine-grained visual recognition, and image captioning. The attention information can be modeled as a attention region sequence in an image. A recurrent neural network is utilized to predict the next attention region based on the current attention region's location and visual features. Some employ this framework for object recognition, object detection, and fine-grained object recognition, respectively. Others have developed an attention-based model for image captioning that uses recurrent neural network as generator, so that the model focuses its attention on different image regions when generating different words in sentences. The model extracts a set of proposal regions in each image, and the attention weights are learned using the decoding LSTM generator hidden state and the visual features extracted in each proposal region. In one case [see T. Y. Lin, A. Roy Chowdhury, and S. Maji. Bilinear CNN models for fine-grained visual recognition. *arXiv preprint arXiv*:1504.07889, 2015], a bilinear CNN structure was proposed to combine the location and content for fine-grained image classification. ABC-CNN is inspired by the successful application of attention on these vision tasks and utilizes question-guided attention to improve VQA performance.

Configurable Convolutional Neural Network:

A dynamic convolutional layer architecture for short range weather prediction has been proposed [see B. Klein, L. Wolf, and Y. Afek. A dynamic convolutional layer for short range weather prediction. *Proceedings of the IEEE Conference on Computer Vision and Pattern Recognition*, pages 4840-4848, 2015]. The convolutional kernels in the dynamic convolutional layer are determined by a neural network encoding the information of weather images in previous time steps. In VQA, the most important clue to determine the attention regions is the question. Thus, the configurable convolutional kernels in embodiments of the ABC-CNN framework are determined by the question embedding.

C. Attention-Based Configurable CNN

An embodiment of a framework of ABC-CNN is illustrated in FIG. 2. In embodiments, QA pairs with single-word answers are a focus of examples herein because the task may be treated as a multi-class classification problem, which simplifies the evaluation metrics and allows for a focus on developing question-guided attention model. However, it shall be noted that embodiments of the attention model may be easily extended to generate multiword sentences as answers by replacing the multi-class classification model with an LSTM decoder.

As shown in FIG. 2, the depicted ABC-CNN embodiment comprises four components: the image feature extraction part 205, the question understanding part 210, the attention extraction part 215, and the answer generation part 220. In the image feature extraction part 205, in embodiments, a deep convolutional neural network 207 is utilized to extract an image feature map I 208 for each image as the image representation. In embodiments, the VGG-19 deep convolutional neural network [see K. Simonyan and A. Zisserman. A very deep convolutional networks for large-scale image recognition. *arXiv* preprint *arXiv*:1409.1556, 2014] pre-trained on 1000-class ImageNet classification challenge 2012 dataset [see J. Deng, W. Dong, R. Socher, L.-J. Li, K. Li, and L. Fei-Fei. Imagenet: A large-scale hierarchical image database. In *Computer Vision and Pattern Recognition, 2009. CVPR 2009. IEEE Conference on*, pages 248-255. IEEE, 2009] and a fully convolutional segmentation neural network [L. C. Chen, G. Papandreou, I. Kokkinos, K. Murphy, and A. L. Yuille. Semantic image segmentation with deep convolutional nets and fully connected crfs. *arXiv preprint arXiv*:1412.7062, 2014] pre-trained on PASCAL 2007 segmentation dataset are used. In embodiments, the question understanding part 210 adopts an LSTM layer 214 to learn a dense question embedding s 213 to encode semantic information of image-related questions. In embodiments, a core component of the ABC-CNN framework is the attention extraction part 215. In embodiments, the attention extraction part configures a set of convolutional kernels 216 according to the dense question embedding. The convolutional kernels 216, characterizing the visual features of the objects asked in the question, are applied on the image feature maps 208 to generate question-guided attention maps 218. In embodiments, the answer generation part 220 answers the question using a multi-class classifier on refines of a fusion of the image feature map I 208, the attention weighted image feature map 222, and the dense question embedding 213. The rest of this section will describe in more detail embodiments of each component of an ABC-CNN framework.

1. Attention Extraction

In embodiments, a question-guided attention map, m, reflecting the image regions queried by the question, is generated from each image-question pair using a configurable convolutional neural network. The convolutional kernels in the configurable convolutional neural network may be configured according to the dense question embedding s by projecting the dense question embedding s from semantic space to visual space.

$$k = \sigma(W_{sk}s + b_k), \sigma(x) = \frac{1}{1+e^{-x}} \quad (1)$$

where $\sigma(.)$ is a sigmoid function.

In embodiments, the dense question representation s encodes the semantic object information asked in the question. In embodiments, the projection transforms the semantic information into the corresponding visual information as a question-configured kernel, which has the same number of channels as the image feature map I. For example, if the question is "What is the color of the umbrella?," the question-configured kernel k should be the visual features of umbrella.

In embodiments, the question-guided attention map may be generated by applying the question-configured kernels k on the image feature map I.

$$m_{ij} = P(ATT_{ij} | I, s) = \frac{e^{z_{ij}}}{\sum_i \sum_j e^{z_{ij}}}, z = k * I \qquad (2)$$

where $m_{ij}$ are the elements of the question-guided attention map at position (i, j), and the symbol * represents the convolution operation. In embodiments, the softmax normalization produces the spatial attention distribution as a question-guided map. In embodiments, the convolution is padded to ensure that the attention map m has the same size as the image feature map I. The question-guided attention map focuses on the regions asked by questions. For example, the question "What is the color of the umbrella?" can generate the attention map focusing on umbrella regions in images because the convolutional kernels are configured to be car visual features by the question.

With the attention map m, the question answering accuracy can be improved for all four classes of questions for the following reasons:

For counting questions, such as, "how many cars in the objects?", the attention map filters out the unrelated regions, which makes it easier for the object to infer the number of objects in images.

For color questions, such as, "what is the color of the coat?", the color of the specific object can be answered more effectively by focusing on the object of interest.

For object questions, such as, "what are sitting on top of the desk?", the attention map can filter out less relevant regions, such as background, and infer better locations to look for objects according to the spatial relationships.

For location questions, such as "where is the car in the image?", the attention map is important for generating the correct answers because it evidently describes where the object is in the image.

2. Question Understanding

Question understanding is important for visual question answering. The semantic meaning of questions not only provides the most important clue for answer generation, but also may be used to determine the configurable convolution kernels to generate attention map.

Figure 3:
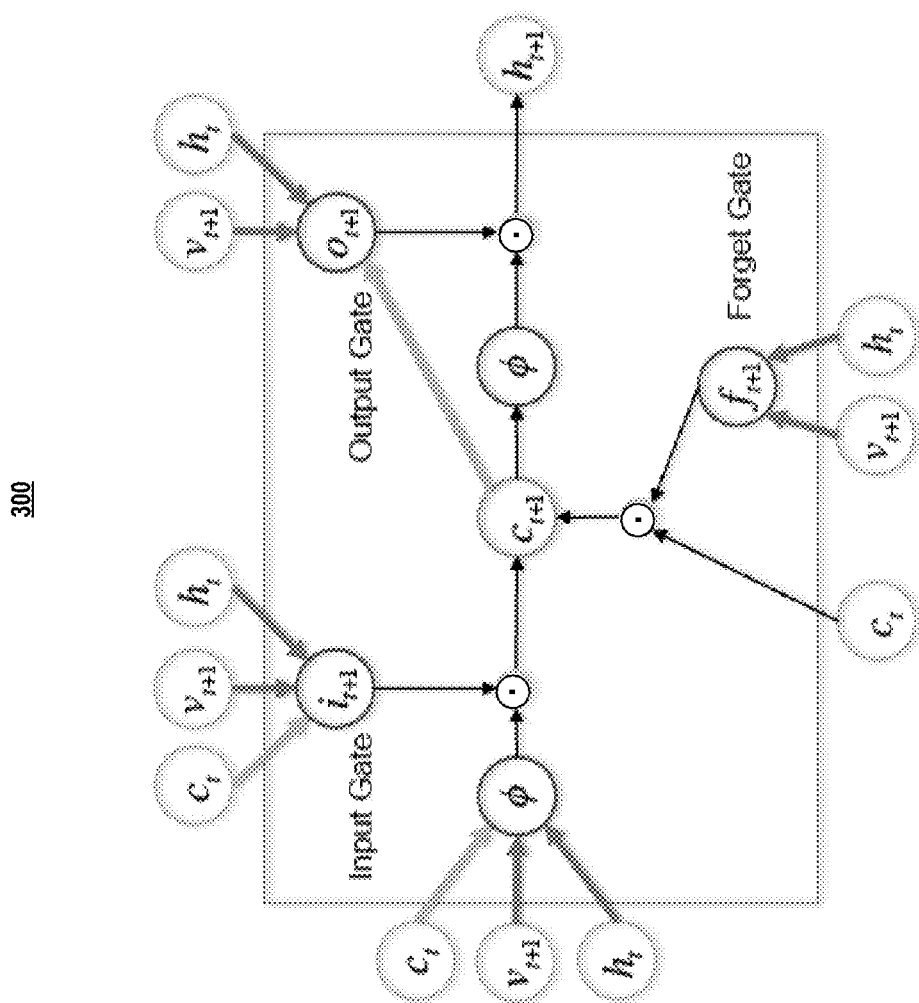
FIG. 3 depicts details of an embodiment for an LSTM framework for query processing, in accordance with embodiments of the present disclosure.

Recently, the long short term memory (LSTM) model has been shown to work very well in language understanding. In embodiments, a LSTM model is employed to generate a dense question embedding to characterize the semantic meaning of questions. In embodiments, a question q is first tokenized into word sequence $\{v_t\}$. In embodiments, all the upper case characters are converted to lower case characters and all the punctuation is removed. The words that appear in training set but do not appear in the test set are replaced with a special symbol, such as #OOV#, and #B# and #E# special symbols are added to the head and end of the sequence. According to a question dictionary, each word may be represented as a dense word embedding vector. In embodiments, an LSTM is applied to the word embedding sequence to generate a hidden state $h_t$ from each vector $v_t$, using memory gate $c_t$ and forget gate $f_t$ (Eq. 3, shown below in [0048]-[0053]):

$$i_t = \sigma(W_{vi}v_t + W_{hi}h_{t-1} + b_i)$$

$$f_t = \sigma(W_{vf}v_t + W_{hf}h_{t-1} + b_f)$$

$$o_t = \sigma(W_{vo}v_t + W_{ho}h_{t-1} + b_o)$$

$$g_t = \phi(W_{vg}v_t + W_{hg}h_{t-1} + b_g)$$

$$c_t = f_t \odot c_{t-1} + i_t \odot g_t$$

$$h_t = o_t \odot \phi(c_t)$$

where $\phi$ is the hyperbolic tangent function and $\odot$ represents the element-wise production between two vectors. The details of an embodiment for an LSTM framework for query processing are illustrated in FIG. 3. The semantic information s of the input question q is obtained by averaging the LSTM states $\{h_t\}$ over all the time steps.

3. Image Feature Extraction

In embodiments, the visual information in each image is represented as an N×N×D image feature map. The feature map may be extracted by dividing the image into N×N grids, and extracting a D-dimension feature vector f in each cell of the grid. In embodiments, five (5) windows are extracted in the center, upper left, upper right, lower left, and lower right corners in each cell of the original image and the left-right flipped image, resulting in a total of ten (10) windows for each cell. In embodiments, the VGG-19 deep convolutional neural network extracts a D-dimension feature vector for each window. In embodiments, the D-dimension feature vector for each cell is an average of all the ten (10) D-dimension feature vectors. The final N×N×D image feature map is the concatenation of N×N×D-dimensional feature vectors.

It is also possible to exploit fully convolutional neural network architecture to extract image feature maps more efficiently. In embodiments, a segmentation model [see, e.g., L. C. Chen, G. Papandreou, I. Kokkinos, K. Murphy, and A. L. Yuille. Semantic image segmentation with deep convolutional nets and fully connected crfs. In *arXiv preprint arXiv*:1412.7062, 2014] pretrained on PASCAL 2007 segmentation dataset was employed, and led to slightly better performance.

4. Answer Generation

In embodiments, the answer generation part is a multi-class classifier on the original image feature map, the dense question embedding, and the attention weighted feature map. In embodiments, the attention map is employed to spatially weight the image feature map I. The weighted image feature map focuses on the objects corresponding to the questions. In embodiments, the spatial weighting is achieved by the element-wise production between each channel of the image feature map and the attention map:

$$I'_i = I_i \odot m \qquad (4)$$

where $\odot$ represents element-wise production. $I'_i$ and $I_i$ represent the i-th channel of attention weighted feature map I' and original image feature map I, respectively. The attention weighted feature maps lower the weights of the regions that are irrelevant to the question. In embodiments, to avoid overfitting a 1×1 convolution is applied on the attention weighted feature map to reduce the number of channels, resulting in a reduced feature map $I_r$. In embodiments, the question's or query's semantic information s, the image feature map I, and the reduced feature map $I_r$ are fused by a nonlinear projection:

$$h = g(W_{ih}I + W_{rh}I_r + W_{sh}s + b_h) \qquad (5)$$

where h denotes the final projected feature, and g(.) is the element-wise scaled hyperbolic tangent function: $g(x) = 1.7159 \cdot \tan h(\frac{2}{3}x)$. This function leads the gradients into the most non-linear range of value and enables a higher training speed.

In embodiments, a multi-class classifier with softmax activation is trained on the final projected features h. The id of an answer may be specified in an answer dictionary. The answer generated by ABC-CNN is the word with the maximum probability:

$$a^* = \arg\max_{a \in V_a} p_a \text{ s.t. } p_a = g(W_{ha}h + b_a) \quad (6)$$

wherein $V_a$, is the set of all words in the answer dictionary.

Notice that, for embodiments, the word dictionary for questions and answers are not shared. That means the representation for the same word may be different for questions and answers.

Figure 4:
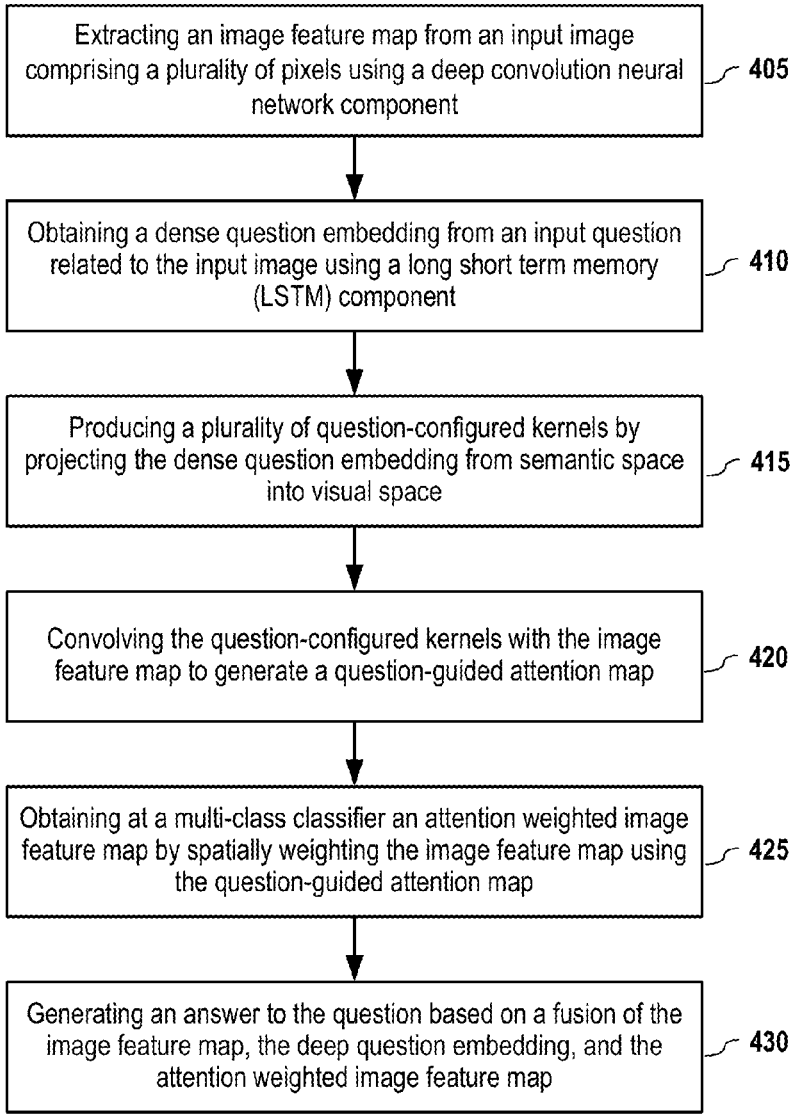
FIG. 4 depicts an example flow diagram for answer generation based on attention weighted image, in accordance with embodiments of the present disclosure.

FIG. 4 depicts an example flow diagram for answer generation using an ABC-CNN architecture, in accordance with embodiments of the present disclosure. In embodiments, the ABC-CNN architecture extracts an image feature map from an input image comprising a plurality of pixels using a deep convolutional neural network in step 405 and obtains a dense question embedding from an input question related to the input image using a long short term memory (LSTM) layer in step 410. A plurality of question-configured kernels is produced in step 415 by projecting the dense question embedding from semantic space into visual space. In step 420, a question-guided attention map is generated by convolving the question-configured kernels with the image feature map. In step 425, an attention weighted image feature map is obtained at a multi-class classifier by spatially weighting the image feature map using the question-guided attention map. The attention weighted feature map functions to lower weights of regions irrelevant to the question or focus on regions associated to the question. In embodiments, the spatial weighting is achieved by element-wise production between each channel of the image feature map and the question-guided attention map. Finally, an answer to the question is generated in step 430 based on a fusion of the image feature map, the deep question embedding, and the attention weighted image feature map.

Figure 5:
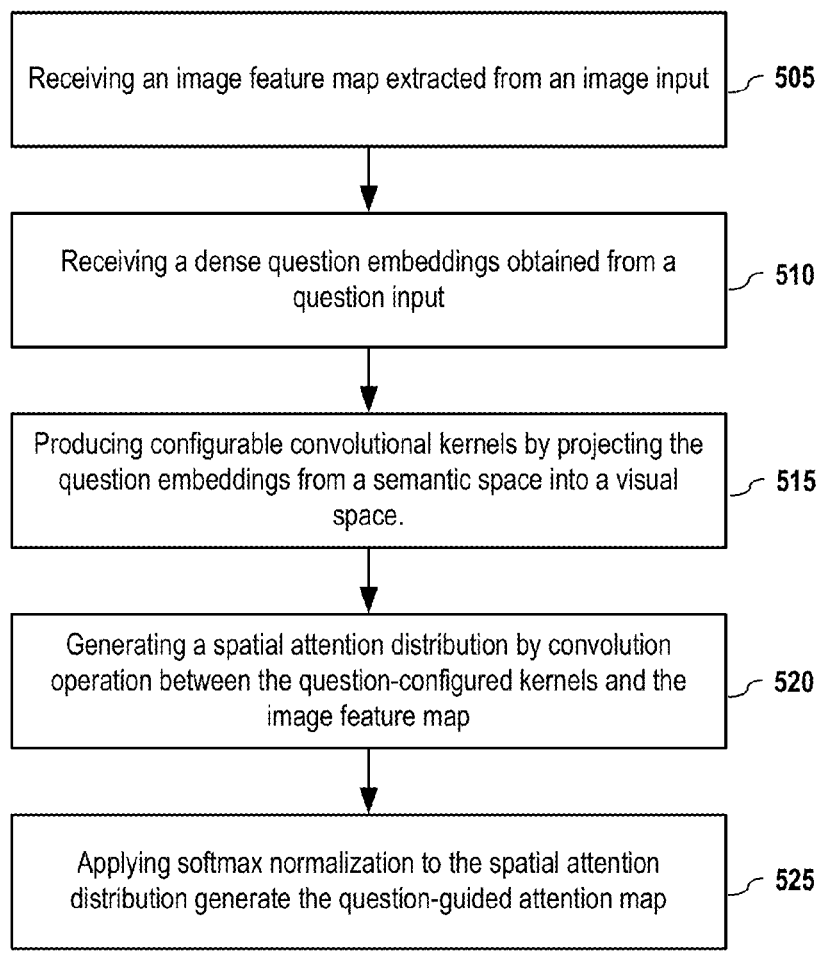
FIG. 5 depicts an example flow diagram for generating attention weighted image, in accordance with embodiments of the present disclosure.

FIG. 5 depicts an example flow diagram for generating a question-guided attention map using the ABC-CNN architecture, in accordance with embodiments of the present disclosure. In embodiments, the attention map generation part receives an image feature map extracted from an image input in step 505 and receives a dense question embeddings obtained from a question input using a LSTM in step 510. A set of configurable convolutional kernels are produced in step 515 by projecting the question embeddings from a semantic space into a visual space. In step 520, a spatial attention distribution is generated by convolution operation between the question-configured kernels and the image feature map. In embodiments, the ABC-CNN framework has initialization weights randomly adjusted during pre-training to ensure that each dimension of the activations of all layers (including the CNN layer and LSTM layer etc.) within the ABC-CNN framework has zero mean and one standard derivation. In step 525, a softmax normalization is applied to the spatial attention distribution generate the question-guided attention map.

5. Training and Testing

In embodiments, the whole framework may be trained in an end-to-end way with stochastic gradient descent and the adadelta [see M. D. Zeiler. Adadelta: An adaptive learning rate method. arXiv preprint arXiv:1212.5701, 2012] algorithm. Each batch of the stochastic gradient descent randomly samples 64 image question pairs independently, and back propagation may be applied to learn all the weights of the ABC-CNN architecture. In embodiments, the initialization weights of all the layers may be randomly adjusted to ensure that each dimension of the activations of all layers has zero mean and one standard derivation. In embodiments, the initial learning rate is set to be 0.1. In experiments, the weights in image feature extraction part may be fixed to allow faster training speed, although it is possible to train all the weights in an ABC-CNN embodiment in an end-to-end way.

During the testing stage, in embodiments, an image feature map is extracted for each image. In embodiments, given a question, its dense question embedding is produced, and the question embedding is used to configure the convolutional kernels to generate the attention map. In embodiments, the multi-class classifier generates the answer using the fusion of the original feature map, the question embedding, and the attention weighted feature map.

D. Experiments

Embodiments of the presented model were evaluated on the Toronto COCO-QA dataset [see M. Ren, R. Kiros, and R. Zemel. Exploring models and data for image question answering. In arXiv:1505.02074. 2015], the DAQUAR dataset [see M. Malinowski and M. Fritz. A multi-world approach to question answering about real-world scenes based on uncertain input. In Advances in Neural Information Processing Systems, pages 1682-1690, 2014] and the VQA dataset [see S. Antol, A. Agrawal, J. Lu, M. Mitchell, D. Batra, C. L. Zitnick, and D. Parikh. VQA: Visual Question Answering. arXiv preprint arXiv:1505.00468, 2015]. The embodiments were evaluated on the QA pairs with single word answers, which accounts for (100%, 85%, 90%) of Toronto-QA, VQA, and DAQUAR datasets, respectively. It is also consistent with the evaluation in M. Ren, R. Kiros, and R. Zemel, "Exploring models and data for image question answering," (In arXiv:1505.02074. 2015). Besides, embodiments of the ABC-CNN framework can be easily extended to generate full sentences as answers by using an RNN decoder in the answer generation part.

It shall be noted that the experiments and results referenced in this patent document (in this section or in any other section) are provided by way of illustration and were performed under specific conditions using a specific embodiment or embodiments; accordingly, neither these experiments nor their results shall be used to limit the scope of the disclosure of the current patent document.

1. Implementation Details

In the experiments, the resolution of both the image feature map and the attention map are chosen to be 3×3, except for ATT-SEG-HSV model, which uses the features extracted from the fully convolutional segmentation network (16×16). Each image cell generates a 4096-dimensional image feature vector using a pre-trained VGG network [see K. Chatfield, K. Simonyan, A. Vedaldi, and A. Zisserman. Return of the devil in the details: Delving deep into convolutional nets. arXiv preprint arXiv:1405.3531, 2014]. The image feature vectors from all the image cells constitute an image feature map with dimension 4096×3×3. To avoid overfitting, the dimension of the feature map is reduced to 256×3×3 with an 1×1 convolution. The dimension of the dense question embedding is 256. In addition, the HSV color feature map is added to the image feature map (ATT-HSV). The color feature of each cell is encoded as HSV histogram of the pixels in it. A fully convolutional neural network [L.-C. Chen, G. Papandreou, I. Kokkinos, K. Murphy, and A. L. Yuille. Semantic image segmentation with deep con-volutional nets and fully connected crfs.

arXiv preprint arXiv:1412.7062, 2014] pretrained on PASCAL 2007 segmentation dataset is also employed to generate 16×16×1024 feature maps, and concatenate them with HSV color feature maps as image feature maps (ATT-SEG-HSV). It takes around 24 hours to train the network ATT-HSV on Toronto COCO-QA dataset with 4 K40 Nvidia GPUs. The system can generate an answer at 9.89 ms per question on a single K40 GPU.

2. Datasets

Embodiments of models in accordance with the present disclosure were evaluated on three datasets: DAQUAR, Toronto COCO-QA, and VQA.

The DAQUAR dataset has two versions: a full dataset (DQ-full) and a reduced dataset (DQ-reduced). DQ-reduced has question answer pairs of 37 object classes, which is a subset of the DQ-full dataset that has 894 object classes. Both versions use the indoor scenes images from NYU-Depth V2 dataset [see N. Silberman, D. Hoiem, P. Kohli, and R. Fergus. Indoor segmentation and support inference from RGBD images. In *Computer Vision—EGGV* 2012, pages 746-760. Springer, 2012]. The DQ-full dataset contains 795 training images with 6794 QA pairs, and 654 test images with 5674 QA pairs. The DQ-reduced dataset contains 781 training images with 3825 QA pairs and 25 test images with 286 QA pairs. In experiments, the DAQUAR dataset was only tested and trained on QA pairs with single word answers, which is consistent with the evaluation done by Ren et al. [see M. Ren, R. Kiros, and R. Zemel. Exploring models and data for image question answering. In *arXiv:* 1505.02074, 2015.]. Such QA pairs constitute (90.6%, 89.5%) and (98.7%, 97.6%) in the training and test sets for DQ-full and DQ-reduced datasets, respectively.

Toronto COCO-QA dataset uses images from Microsoft COCO dataset (MS-COCO). Its QA pairs only contain single word answers. Its basic statistics are summarized in Table 1.

TABLE 1

Toronto COCO-QA question type break-down [see P. Sermanet, A. Frome, and E. Real. Attention for fine-grained categorization. arXiv preprint arXiv: 1412.7054, 2014.].

| Category | Train | % | Test | % |
| --- | --- | --- | --- | --- |
| Object | 54992 | 69.84 | 27206 | 69.85 |
| Number | 5885 | 7.47 | 2755 | 7.07 |
| Color | 13059 | 16.59 | 6509 | 16.71 |
| Location | 4800 | 6.10 | 2478 | 6.36 |
| Total | 78736 | 100.00 | 38948 | 100.00 |

VQA dataset is a recently collected dataset which is also built with images in MS-COCO dataset. The proposed model on VQA Real Image (Open-Ended) task in VQA dataset is evaluated. It contains 82783 training images, 40504 validation images, and 81434 testing images. Each image in MS-COCO dataset is annotated with three (3) questions, and each question has ten (10) candidate answers. The total number of QA pairs for training, testing, and validation is 248349, 121512, 244302, respectively. An embodiments of the current model was evaluated on the single-word answer QA pairs in VQA dataset, which constitute 86.88% of the total QA pairs in this dataset. Some examples from the three datasets are shown in FIG. 6.

3. Evaluation Metrics

The performance of the VQA models is evaluated with "answer accuracy" and "Wu-Palmer similarity measure Set" (WUPS) score. The answer accuracy (ACC) computes the percentage of the generated answers that exactly match the ground truth answers. The WUPS score is derived from the Wu-Palmer (WUP) similarity [see Z. Wu and M. Palmer. Verbs semantics and lexical selection. In *Proceedings of the 32nd annual meeting on Association for Computational Linguistics*, pages 133-138. Association for Computational Linguistics, 1994], whose value is in the range of [0, 1]. WUP similarity measures the similarity of two words based on the depth of their lowest common ancestor in the taxonomy tree. The WUPS score with threshold is the average of the down-weighted WUPS score for all the generated answers and ground truth. If WUPS score of two words $S_{wups}$ is below a threshold, their down-weighted WUPS score is $0.1 S_{wups}$. Otherwise, its down-weighted WUPS is $S_{wups}$. WUPS scores with threshold 0.0 and 0.9 are used in the experiments.

4. Baseline Methods

An embodiment of the current method was compared with different benchmark methods. All the baseline models are listed below:

1. VIS+LSTM (VL): It is the proposed framework by Ren et al. [see M. Ren, R. Kiros, and R. Zemel. Exploring models and data for image question answering. In *arXiv:* 1505.02074. 2015], with a CNN extracting image features followed by a dimension reduction layer. The image features are then inserted into the head position of the question word embedding sequences as inputs for question LSTM.

2. 2-VIS+BLSTM (2VB): The image features are encoded at the head and the end of word embedding sequences. Besides, the LSTM in Ren et al. is set to go in both forward and backward directions.

3. IMG+BOW (IB): Ren et al. used Bag-of-Words features to generate the dense question embedding.

4. IMG: Only the image features are used for answering the questions. It is called a "deaf" model.

5. LSTM: The answers are generated only using the dense question embedding from LSTM. It is called a "blind" model.

6. ENSEMBLE: Ren et al. evaluated the fusion model by using an ensemble of all the above methods.

7. Q+I: Antol et al. [S. Antol, A. Agrawal, J. Lu, M. Mitchell, D. Batra, C. L. Zitnick, and D. Parikh. VQA: Visual Question Answering. *arXiv preprint arXiv:* 1505.00468, 2015] trained a multi-class classifier using both the dense question embeddings and image features to achieve question answering.

8. Q+I+C: Similar to the Q+I model, the Q+I+C model adopts the dense embeddings of labeled image captions as an additional input.

9. ASK: Malinowski et al. [M. Malinowski, M. Rohrbach, and M. Fritz. Ask your neurons: A neural-based approach to answering questions about images. *arXiv preprint arXiv:*

1505.01121, 2015] linearly combine CNN features and question embeddings in an LSTM decoder to generate answers.

5. Results and Analysis

Tables 2, 4, and 5 summarize the performance of different models on Toronto COCO-QA, DQ-reduced and DQ-full datasets, respectively. Table 3 breaks down the performance of different methods in each category on Toronto COCO-QA dataset.

In Table 2, ABC-CNN using only VGG feature maps (ATT) outperforms most of the single models of Ren et al. [M. Ren, R. Kiros, and R. Zemel. Exploring models and data for image question answering. In arXiv:1505.02074. 2015]. By combining HSV feature maps with VGG feature maps (ATT-HSV), the performance of ABC-CNN surpasses all the baseline models. It even outperforms the ENSEMBLE model by 0.2% in term of answer accuracy, although we only employ a single model. The ABC-CNN outperforms the baseline methods in "object", "number" and "location" categories, because question-guided attention exploits semantics of questions and the contextual information in images to answer the questions. Its accuracy is slightly lower than IB and ENSEMBLE models in the "color" category.

It is also found that the performance of the fully convolutional model ATT-SEG-HSV is slightly better than VGG model ATT-HSV, but extracting feature maps with fully convolutional neural networks is much faster. Using VGG, SEG, and HSV features together (ATT-VGG-SEG-HSV) results in the best performance. In particular, adding a fully convolutional model helps correctly answer the location questions. The attention in ABC-CNN (NO-ATT) is also removed as an ablative experiment, and it results in 1.34%, 0.85%, and 0.35% loss in accuracy, WUPS 0.9 and WUPS 0.0 scores, respectively.

In Table 4, ABC-CNN model is compared to the baseline models on DQ-reduced dataset. Its performance is higher than all the single models on all the metrics. It is only 0.53% lower than the ENSEMBLE model on WUPS 0.9 measure.

On DQ-full and VQA datasets, ABC-CNN outperforms state-of-the-art methods on both datasets in Table. 5 and 6. On DQ-full dataset, the ABC-CNN model is the same as the models on Toronto COCO-QA and DQ-reduced dataset. On VQA dataset, to make a fair evaluation, the same answer dictionary that contains the 1000 most frequent answers (ATT 1000) is employed as Antol et al. [S. Antol, A. Agrawal, J. Lu, M. Mitchell, D. Batra, C. L. Zitnick, and D. Parikh. VQA: Visual question answering. arXiv preprint arXiv:1505.00468, 2015]. The ABC-CNN model is also evaluated using the answer dictionary that contains all the answers (ATT Full).

Figure 7:
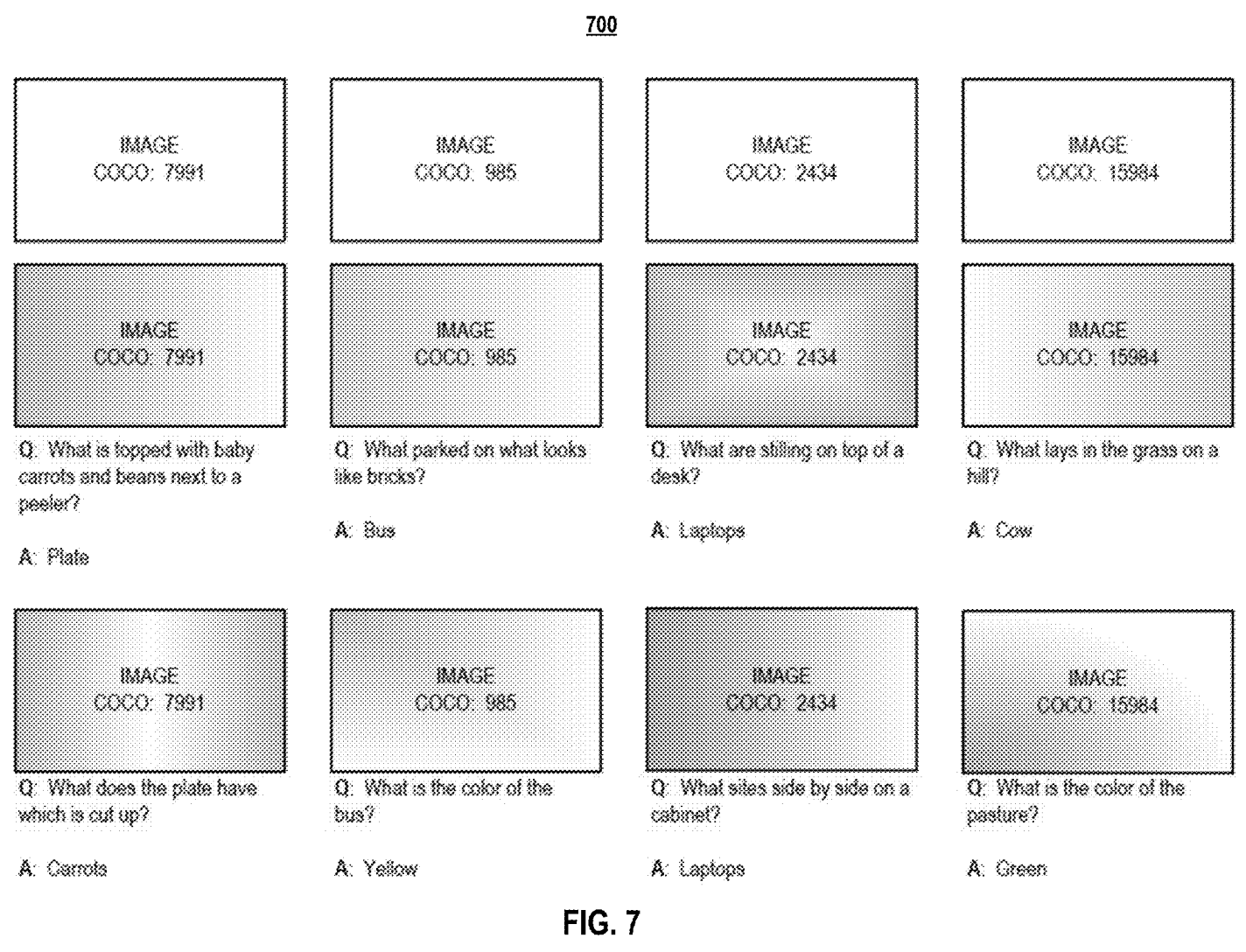

Some of the generated question-guided attention maps and their corresponding images and questions are shown in FIG. 7. It is observed that the question-guided attention maps successfully capture different question's intents with different attention regions. With these attention maps, ABC-CNN is capable of generating more accurate answers by focusing its attention on important regions and filtering out irrelevant information. Since the original feature map is also provided when predicting answers, ABC-CNN can answer the question without using the attention map if the object queried is the only object in the image, such as "what lays in grass on hill?".

TABLE 3

Toronto COCO-QA accuracy per category

| Model | Object | Number | Color | Location |
|---|---|---|---|---|
| IMG | 0.4073 | 0.2926 | 0.4268 | 0.4419 |
| IB | 0.5866 | 0.4410 | 0.5196 | 0.4939 |
| VL | 0.5653 | 0.4610 | 0.4587 | 0.4552 |
| 2VB | 0.5817 | 0.4479 | 0.4953 | 0.4734 |
| ENSEMBLE | 0.6108 | 0.4766 | 0.5148 | 0.5028 |
| NO-ATT | 0.5882 | 0.4319 | 0.4168 | 0.4762 |
| ATT | 0.5977 | 0.4693 | 0.4359 | 0.4911 |
| ATT-HSV | 0.6217 | 0.4799 | 0.4727 | 0.5194 |
| ATT-SEG-HSV | 0.6238 | 0.4617 | 0.4694 | 0.5278 |
| ATT-SEG-VGG-HSV | 0.6246 | 0.4570 | 0.4681 | 0.5367 |

TABLE 4

Results on DAQUAR-reduce dataset

| Model | ACC. | WUPS 0.9 | WUPS 0.0 |
|---|---|---|---|
| LSTM | 0.3273 | 0.4350 | 0.8162 |
| IMG + BOW | 0.3417 | 0.4499 | 0.8148 |
| VIS + LSTM | 0.3441 | 0.4605 | 0.8223 |
| 2-VIS + BLSTM | 0.3578 | 0.4683 | 0.8215 |
| ENSEMBLE | 0.3694 | 0.4815 | 0.8268 |
| NO-ATT | 0.3931 | 0.4445 | 0.8230 |
| ATT | 0.4276 | 0.4762 | 08304 |
| HUMAN | 0.6027 | 0.6104 | 0.7896 |

TABLE 5

Results on DAQUAR-full dataset

| Model | ACC. | WUPS 0.9 | WUPS 0.0 |
|---|---|---|---|
| ASK | 0.1943 | 0.2528 | 0.6200 |
| ATT | 0.2537 | 0.3135 | 0.6589 |
| HUMAN | 0.5020 | 0.5082 | 0.6727 |

TABLE 6

Performances of different models on VQA dataset

| Model | Q + I | Q + I + C | ATT 1000 | ATT Full |
|---|---|---|---|---|
| ACC. | 0.2678 | 0.2939 | 0.4838 | 0.4651 |

E. System Embodiments

In embodiments, aspects of the present patent document may be directed to or implemented using information handling systems/computing systems. For purposes of this disclosure, a computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data for business, scientific, control, or other purposes. For example, a computing system may be a personal computer (e.g., laptop), tablet computer, phablet, personal digital assistant (PDA), smart phone, smart watch, smart package, server (e.g., blade server or rack server), a network storage device, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 8:
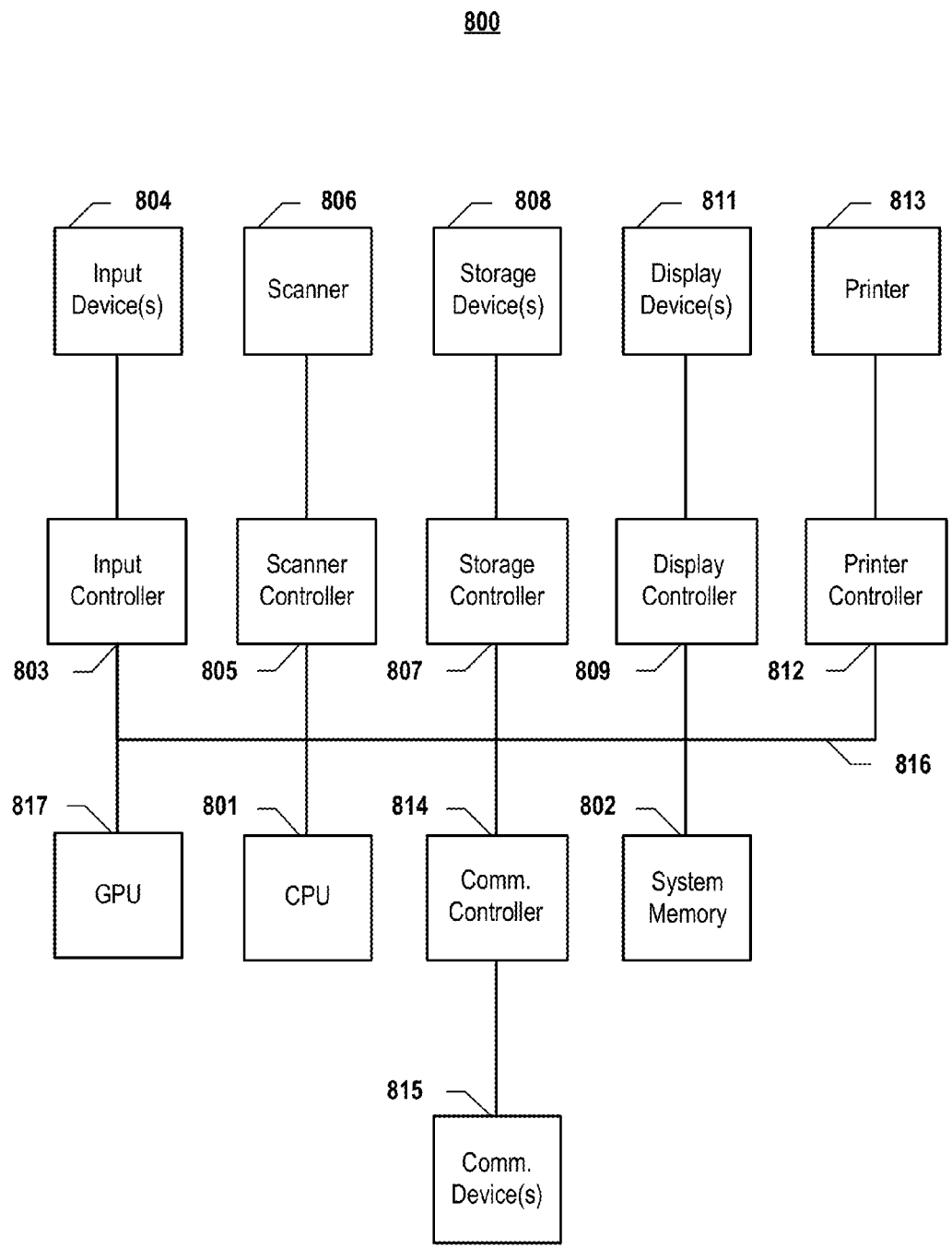
FIG. 8 depicts a simplified block diagram of a computing device/information handling system, in accordance with embodiments of the present disclosure.

FIG. 8 depicts a simplified block diagram of a computing device/information handling system (or computing system) according to embodiments of the present disclosure. It will be understood that the functionalities shown for system 800 may operate to support various embodiments of an information handling system—although it shall be understood that an information handling system may be differently configured and include different components.

As illustrated in FIG. 8, system 800 includes one or more central processing units (CPU) 801 that provides computing resources and controls the computer. CPU 801 may be implemented with a microprocessor or the like, and may also include one or more graphics processing units (GPU) 817 and/or a floating point coprocessor for mathematical computations. System 800 may also include a system memory 802, which may be in the form of random-access memory (RAM), read-only memory (ROM), or both.

A number of controllers and peripheral devices may also be provided, as shown in FIG. 8. An input controller 803 represents an interface to various input device(s) 804, such as a keyboard, mouse, or stylus. There may also be a scanner controller 805, which communicates with a scanner 806. System 800 may also include a storage controller 807 for interfacing with one or more storage devices 808 each of which includes a storage medium such as magnetic tape or disk, or an optical medium that might be used to record programs of instructions for operating systems, utilities, and applications, which may include embodiments of programs that implement various aspects of the present invention. Storage device(s) 808 may also be used to store processed data or data to be processed in accordance with the invention. System 800 may also include a display controller 809 for providing an interface to a display device 811, which may be a cathode ray tube (CRT), a thin film transistor (TFT) display, or other type of display. The computing system 800 may also include a printer controller 812 for communicating with a printer 813. A communications controller 814 may interface with one or more communication devices 815, which enables system 800 to connect to remote devices through any of a variety of networks including the Internet, a cloud resource (e.g., an Ethernet cloud, an Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 816, which may represent more than one physical bus. However, various system components may or may not be in physical proximity to one another. For example, input data and/or output data may be remotely transmitted from one physical location to another. In addition, programs that implement various aspects of this invention may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Embodiments of the present invention may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present invention may further relate to computer products with a non-transitory, tangible computer-readable medium that have computer code thereon for performing various computer-implemented operations. The media and computer code may be those specially designed and constructed for the purposes of the present invention, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present invention may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present invention. One skilled in the art will also recognize that a number of the elements described above may be physically and/or functionally separated into sub-modules or combined together.

It will be appreciated that the preceding examples, embodiments, and experiments are exemplary and are for the purposes of clarity and understanding and not limiting to the scope of the present invention. It is intended that all alternatives, permutations, enhancements, equivalents, combinations, and improvements thereto that are apparent to those skilled in the art, upon a reading of the specification and a study of the drawings, are included within the scope of the present invention. It is therefore intended that the claims include all such alternatives, permutations, enhancements, equivalents, combinations, and improvements that fall within the true spirit and scope of the present invention, unless the following claims by their language expressly state otherwise. It shall be noted that elements of the claims, below, may be arranged differently including having multiple dependencies, configurations, and combinations. For example, in embodiments, the subject matter of various claims may be combined with other claims.

The invention claimed is:

1. A computer-implemented method of improving accuracy in generating an answer to a question input related to an image input, the method comprising:
   receiving an image input;
   receiving a question input related to the image input;
   inputting the question input and the image input into an Attention-Based Configurable Convolutional Neural Networks (ABC-CNN) framework to generate an answer, the ABC-CNN framework comprising:
      an image feature map extraction component comprising a CNN that extracts an image feature map from the image input;
      a semantic question embedding component that obtains question embeddings from the question input;
      a question-guided attention map generation component that receives the image feature map and the question embeddings and that obtains a question-guided attention map focusing on a region or regions asked by question input; and
      an answer generation component that obtains an attention weighted image feature map by weighting image feature map using the question-guided attention map and generates answers based on a fusion of the image feature map, the question embeddings, and the attention weighted image feature map.

2. The computer-implemented method of claim 1 wherein the semantic question embedding part comprises a long short term memory (LSTM) layer to generate the question embeddings to characterize semantic meanings of the question input.

3. The computer-implemented method of claim 1 wherein the question-guided attention map generation part comprises configurable convolutional kernels produced by projecting the question embeddings from a semantic space into a visual space and utilized to convolve with the image feature map to produce the question-guided attention map.

4. The computer-implemented method of claim 3 wherein the convolutional kernels have the same number of channels as the image feature map.

5. The computer-implemented method of claim 3 wherein the question-guided attention map has the same size as the image feature map.

6. The computer-implemented method of claim 1 wherein the image feature map is extracted by dividing the image input into a plurality of grids, and extracting a D-dimension feature vector in each cell of the grids.

7. The computer-implemented method of claim 1 wherein the image feature map is spatially weighted by the question-guided attention map to obtain the attention weighted image feature map.

8. The computer-implemented method of claim 7 wherein the spatial weighting is achieved by element-wise production between each channel of the image feature map and the question-guided attention map.

9. The computer-implemented method of claim 8 wherein the spatial weighting is further defined by softmax normalization for a spatial attention distribution.

10. The computer-implemented method of claim 1 wherein the ABC-CNN framework is pre-trained in an end-to-end way with stochastic gradient descent.

11. The question-guided attention-based deep learning method of claim 10 wherein the ABC-CNN framework has initialization weights randomly adjusted to ensure that each dimension of the activations of all layers within the ABC-CNN framework has zero mean and one standard derivation during pre-training.

12. A computer-implemented method of generating an answer to a question related to an image, the method comprising steps of:
   extracting an image feature map from an input image comprising a plurality of pixels using a deep convolutional neural network;
   obtaining a dense question embedding from an input question related to the input image using a long short term memory (LSTM) layer;
   producing a plurality of question-configured kernels by projecting the dense question embedding from semantic space into visual space;
   convolving the question-configured kernels with the image feature map to generate a question-guided attention map;
   obtaining at a multi-class classifier an attention weighted image feature map by spatially weighting the image feature map using the question-guided attention map, the attention weighted feature map lowering weights of regions irrelevant to the question; and
   generating an answer to the question based on a fusion of the image feature map, the deep question embedding, and the attention weighted image feature map.

13. The method of claim 12 wherein the spatial weighting is achieved by element-wise production between each channel of the image feature map and the question-guided attention map.

14. The method of claim 12 wherein the question-guided attention map adaptively represents each pixel's degree of attention according to the input question.

15. The method of claim 12 wherein the question-guided attention map is obtained by applying the question-configured kernels on the image feature map.

16. The method of claim 12 wherein the image feature map, the deep question embedding, and the attention weighted image feature map are fused by a nonlinear projection.

17. The method of claim 16 wherein the nonlinear projection is an element-wise scaled hyperbolic tangent function.

18. A non-transitory computer-readable medium or media comprising one or more sequences of instructions which, when executed by one or more processors, causes the steps to be performed comprising:
   responsive to receiving a question input, extracting a dense question embedding of the question input;
   responsive to receiving an image input related to the question input, generating an image feature map;
   generating a question-guided attention map based on at least the image feature map and the dense question embedding, the question-guided attention map selectively focusing on areas queried by the question input;
   spatially weighting the image feature map using the question-guided attention map to obtain an attention weighted image; and fusing semantic information, the image feature map, and the attention weighted image to generate an answer to the question input.

19. The non-transitory computer-readable medium or media of claim 18 wherein generating a question-guided attention map further comprises softmax normalization a spatial attention distribution of the attention map.

20. The non-transitory computer-readable medium or media of claim 19 wherein generating a question-guided attention map comprises configuring a set of convolutional kernels according to the dense question embedding and applying the convolutional kernels on the image feature map to generate question-guided attention map.

* * * * *